April 7, 1942.   L. F. CARTER   2,278,913
AUTOMATIC BRAKE FOR GYROSCOPIC INSTRUMENTS
Filed Dec. 20, 1939

INVENTOR
Leslie F. Carter
BY Herbert H. Thompson
his ATTORNEY.

Patented Apr. 7, 1942

2,278,913

UNITED STATES PATENT OFFICE 2,278,913

AUTOMATIC BRAKE FOR GYROSCOPIC INSTRUMENTS

Leslie F. Carter, Leonia, N. J., assignor to Sperry Gyroscope Company, Inc., Brooklyn, N. Y., a corporation of New York Application December 20, 1939, Serial No. 310,213

7 Claims. (Cl. 74—5)

This invention relates to gyroscopic artificial horizons or gyro-verticals, especially adapted for use on aircraft. As at present designed, such instruments are well suited for ordinary flight, but are not adapted for use during the performance of "aerial acrobatics," at which time the gyroscope will strike limit stops or have its gimbals "crossed," either of which usually causes upsetting of the gyro. The present practice is to provide such apparatus, when used on a plane which may perform acrobatics, with a caging or locking device so that the gyroscope may be locked in its gimbals during such stunts and released again when normal flight is resumed. This system, however, requires a rather complex caging device to centralize the gyroscope about both horizontal axes and, in addition, is not entirely satisfactory since the gyro may be released in an inclined position and, owing to its slow precession, will require some minutes to resume the vertical position of its spin axis. Especially is this so where the rate of erection is made small, as disclosed in my prior Patent No. 2,219,295, for Pneumatic erection device for gyroscopes, filed March 18, 1939.

According to my present invention, I propose to overcome the difficulties by an automatically operated brake operating directly on the gyro rotor and automatically brought into operation by the simple expedient of shutting off the air supply to the gyroscope. By this means, the rotor is quickly brought to rest and hence the gyroscopic forces destroyed which cause violent striking of the stops and strains on the pivots during acrobatics. By the same means I prefer also to lower the center of gravity at the time the brake is applied, so that the device becomes pendulous enough to remain in a substantially vertical position when inoperative as a gyroscope. Therefore, when the acrobatics are concluded, all the aviator need do is to open the air valve on the horizon, which will cause release of the brake and start the rotor spinning. The gyroscope will therefore be quickly erected, since it is near the vertical position at the time due to its pendulosity.

Referring to the drawing, showing the preferred form my invention may assume,

Figure 1:
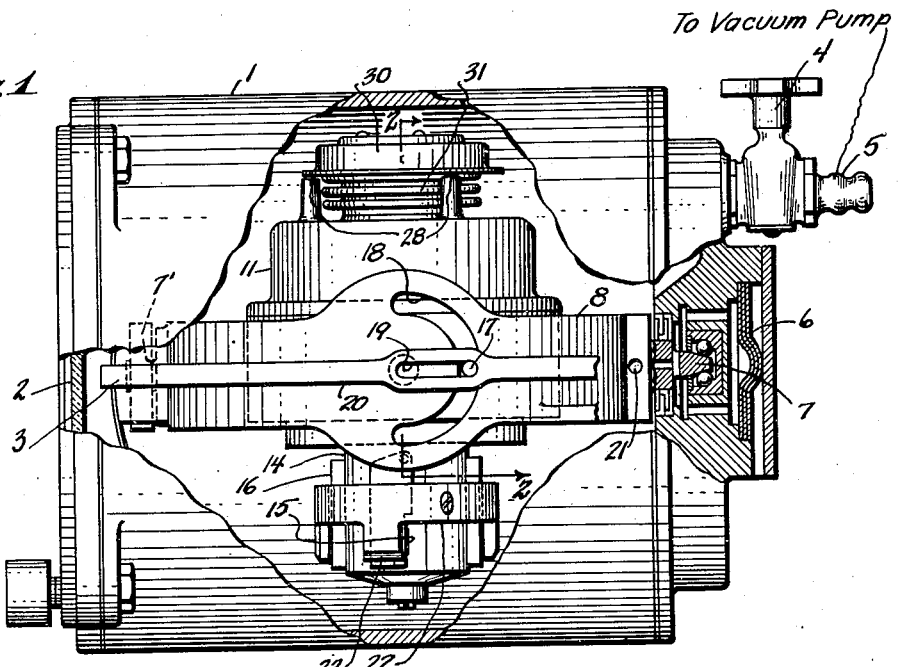
Fig. 1 is a side elevation, partly in section, of a gyroscopic artificial horizon with my automatic brake attached thereto.

I have shown my invention as applied to a gyroscopic artificial horizon such as employed on aircraft. Such instrument is usually mounted within a sealed casing 1 having a transparent front window 2 through which a horizon bar 3 actuated from the gyroscope is visible. Such gyroscopes are usually air driven from a suitable air pump which maintains an air supply either above or below atmospheric pressure. In the form of the invention illustrated, air is continuously exhausted from the interior of the casing 1, through a valve 4 and pipe coupling 5 connected to a vacuum pump or Venturi tube (not shown). Air at atmospheric pressure is admitted through a screened opening 6 in the rear of the case, the air passing in through one of the trunnions 7, 7' of the gimbal ring 8, which is made hollow for the purpose. The air then passes through the channel 9' in said gimbal and through one of the minor trunnion axes 10, which is made hollow for the purpose and which supports the rotor bearing casing 11 within the gimbal ring 8. The air then passes through a channel 12 in the casing and emerges through one or more nozzles (not shown) for spinning the rotor 13. The used air passes downwardly through hollow extension 14 on the bottom of the gyro case and out through four erecting ports 15, normally partially closed by pendulous shutters 16, as well understood in the art.

The horizon bar 3 is shown as actuated in the usual manner both for pitch and roll from a pin 17 extending from the rotor casing through an arcuate slot 18 in the gimbal ring 8 and through a normally horizontal slot 19 in the rearwardly extending arm 20 which carries the horizon bar 3 and which is pivoted at 21 on the rear of the gimbal ring.

There is also shown on the extension 14 a baffle ring or spoiler 22 having downwardly extending baffle members or shutters 23 lying just beyond and displaced slightly from the cut-off edges of the pendulous shutters 16. Such spoilers act to limit or reduce the erecting force exerted by the jets from ports 15 for tilts of more than a few degrees, as more fully explained in my aforesaid prior patent.

Figure 2:
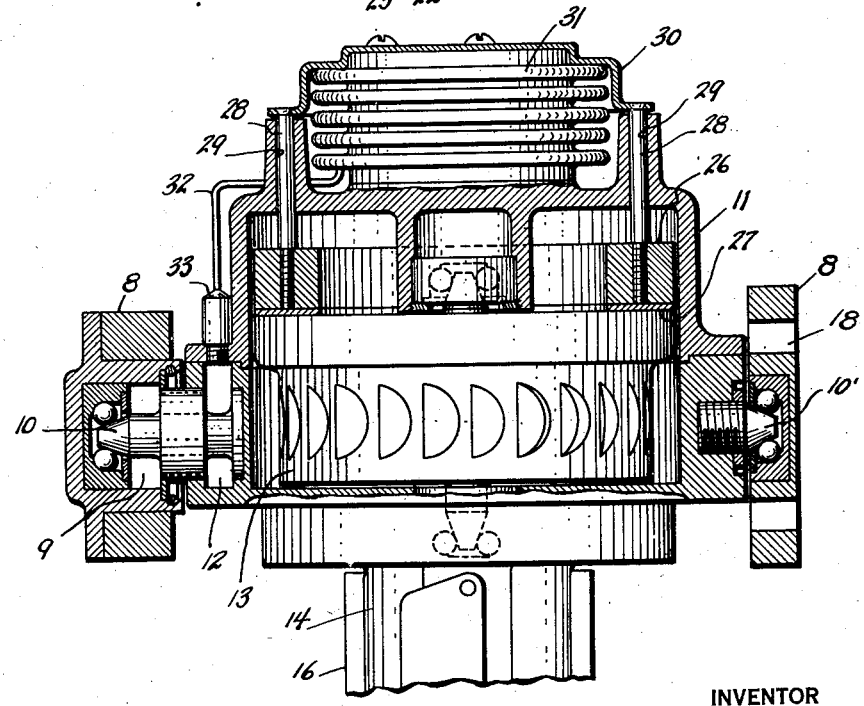
Fig. 2 is a vertical section, on an enlarged scale, through the gyro casing taken substantially on line 2—2 of Fig. 1.

In order to quickly brake the gyroscope to bring it to rest at will, I have shown a brake ring 26 slidably mounted above the rotor 13 and having a friction face 27 engaging the rotor in its braking position. Said ring is shown as guided, lifted, and prevented from rotating by means of pins 28 threaded therein and extending upwardly through holes 29 in bosses extending upwardly from the top of the rotor casing. At their tops, the pins are secured to a plate 30 carried by a metallic expansible bellows 31 mounted on top of the rotor casing. The interior of said bellows is connected, preferably through a capillary tube 32, to a point having a differential pressure as compared to the interior of the case 1 when the rotor is running, such as the atmosphere. As shown, the pipe 32 leads through a small bore coupling 33 to the channel 12 within the casing, through which air at substantially atmospheric pressure flows to the spinning jets on the rotor. In other words, the interior of the bellows is connected in the air supply line to the spinning jet or jets, which is maintained at a pressure above that in the case regardless of the type of air pump employed. When there is no differential air pressure applied to the bellows, it is biased to its collapsed position as shown in Fig. 2, in which position the brake ring is forced down, by the spring walled bellows and by its own weight, against the rotor 13 with sufficient pressure to quickly bring it to rest. When the bellows is expanded, on the other hand, the brake ring is raised to bring its upper surface adjacent or against the top of the interior of the casing 11. Therefore, when the air supply is shut off, the bellows will be collapsed, the brake applied, and the center of gravity lowered by the lowering of the brake ring. When, however, the valve 4 is opened, the pressure on the outside of the bellows will rapidly fall. The bellows will therefore expand somewhat until the air pressure within the same is reduced in proportion to the fall in air pressure in casing 1, thus first releasing the brake promptly. At the same time a slow flow of air will start into the bellows through the capillary tube 32 from the superior pressure, approaching that of the atmosphere, within the channel 12. The result is that the ring 27 is further slowly and gradually lifted until it reaches its highest position, preferably against the top of the casing.

By balancing the gyroscope so that it is in neutral equilibrium with the ring in this lifted position, it will be evident that the gyroscope will be decidedly pendulous with the ring in the lowered position. By restricting the connection 32 to the interior of the bellows, the lifting of the ring is made slow so that the gyroscope remains somewhat pendulous until the speed of the rotor has reached its normal value, so that during the starting up period the pendulosity of the casing assists in rapid erection in case the gyro happens to be inclined somewhat at the start.

By my invention, therefore, I provide a very simple means for both preventing damage to the gyroscope during acrobatics by stopping the rotor, and also assuring that the gyroscope quickly reaches the true vertical when again placed in operating condition. Both of these important results are secured by the simple expedient of quickly stopping the rotor and rendering the device pendulous when shut down for any purpose, such as during such time as acrobatics are being performed.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In an artificial horizon for aircraft, the combination with a universally mounted rotor bearing casing, a spinning means and a rotor journaled therein, a spring applied brake biased to engage the rotor and brake the same, and means responsive to the supply of power to said rotor spinning means for releasing the brake.

2. An artificial horizon as claimed in claim 1, in which said brake is raised and lowered to disengage and engage the rotor, whereby the center of gravity of the rotor casing is lowered when the brake is engaged.

3. In a neutrally mounted gyroscopic horizon having an erecting device, the combination with the neutrally mounted rotor casing and a rotor and rotor spining means therein, of a vertically adjustable brake in said casing for braking the rotor and lowering the center of gravity to make said casing pendulous when said rotor is not spinning, and means responsive to the supply of operating power to said spinning means for lifting said brake to release the same and maintain the rotor casing in neutral equilibrium only while the rotor is spinning.

4. In a neutrally mounted gyroscopic horizon having an air operated erecting device and an air spun rotor, the combination with a neutrally mounted rotor casing, a vertically adjustable brake therein for baking the rotor and lowering the center of gravity to make said casing pendulous when said rotor is not spinning, and resilient means responsive to the supply of operating air pressure to said rotor casing for lifting said brake, whereby the casing is pendulous and will remain upright when the rotor is not spinning, and is mounted in neutral equilibrium when the rotor is spinning.

5. In a gyro-vertical, the combination with an air spun rotor, a casing for the same mounted for oscillation about horizontal axes, an expansible container on said casing, a brake secured to an end wall of said container to be moved thereby against or away from the rotor, a passage for leading air into the casing under a pressure different from that surrounding the casing to spin the rotor, and a connection between the interior of said expansible container and said passage for causing said container to expand to release the brake as pressure is supplied to spin the rotor.

6. In an artificial horizon for aircraft, the combination with a neutrally mounted rotor bearing casing, a rotor spining means and a rotor journaled therein, a brake on said casing for quickly stopping the rotor, and means for applying the brake and automatically lowering the center of gravity of said rotor bearing casing.

7. An artificial horizon as claimed in claim 6, having power means for operating said rotor spinning means and means brought into action by the shuting off of said power means for applying said brake and lowering the center of gravity of the rotor bearing casing.

LESLIE F. CARTER.